United States Patent
Atsuta

(10) Patent No.: US 11,139,758 B2
(45) Date of Patent: Oct. 5, 2021

(54) VIBRATION DRIVE DEVICE CAPABLE OF SWITCHING BETWEEN FREQUENCY CONTROL AND PULSE WIDTH CONTROL, ELECTRONIC APPARATUS, AND METHOD OF CONTROLLING VIBRATION ACTUATOR

(71) Applicant: CANON KABUSHIKI KAISHA, Tokyo (JP)

(72) Inventor: Akio Atsuta, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 16/397,360

(22) Filed: Apr. 29, 2019

(65) Prior Publication Data

US 2019/0348927 A1 Nov. 14, 2019

(30) Foreign Application Priority Data

May 11, 2018 (JP) .............................. JP2018-092293

(51) Int. Cl.
*H02N 2/10* (2006.01)
*G03B 5/06* (2021.01)
*H02N 2/14* (2006.01)

(52) U.S. Cl.
CPC .............. *H02N 2/106* (2013.01); *G03B 5/06* (2013.01); *H02N 2/145* (2013.01); *G03B 2205/0023* (2013.01); *G03B 2205/0061* (2013.01)

(58) Field of Classification Search
CPC .......... H02N 2/106; H02N 2/145; H02N 2/06; H02N 2/0075; H02N 2/008; H02N 2/12;
(Continued)

(56) References Cited

U.S. PATENT DOCUMENTS 6,049,156 A * 4/2000 Yamamoto ............... H02N 2/14
310/316.01
6,054,795 A 4/2000 Yamamoto et al.
(Continued)

FOREIGN PATENT DOCUMENTS

EP 0 849 813 A1 6/1998
JP 10-146072 A 5/1998
(Continued)

OTHER PUBLICATIONS

Extended European Search Report dated Sep. 19, 2019, in European Patent Application No. 19172440.0.

*Primary Examiner* — Emily P Pham
(74) *Attorney, Agent, or Firm* — Venable LLP

(57) ABSTRACT

A vibration drive device that is capable of preventing instability when the speed control is switched between frequency control and pulse width control includes a controller that controls driving of a vibration actuator by applying an alternating voltage to an electromechanical energy conversion element. A switching pulse is generated by switching a DC voltage. A maximum duty ratio of the switching pulse is determined based on a driving condition of the vibration actuator. The driving of the vibration actuator is controlled by switching between frequency control and pulse width control. A gain for frequency control and a gain for pulse width control are set according to the maximum duty ratio so as to prevent electric power or electric current from exceeding an electric power limit or an electric current limit set in advance.

19 Claims, 13 Drawing Sheets

(58) Field of Classification Search
CPC .... H02N 2/14; G03B 5/06; G03B 2205/0023; G03B 2205/0061
See application file for complete search history.

(56) References Cited

U.S. PATENT DOCUMENTS

| | | | |
|---|---|---|---|
| 6,100,622 | A | 8/2000 | Yamamoto et al. |
| 6,107,720 | A | 8/2000 | Atsuta |
| 6,121,714 | A | 9/2000 | Atsuta |
| 6,376,965 | B1 | 4/2002 | Kataoka et al. |
| 6,608,426 | B2 | 8/2003 | Hayashi et al. |
| 6,635,977 | B2 | 10/2003 | Kataoka et al. |
| 6,812,618 | B2 | 11/2004 | Hayashi |
| 9,000,691 | B2 | 4/2015 | Atsuta |
| 9,715,124 | B2* | 7/2017 | Sumioka ................ G03B 5/00 |
| 10,355,621 | B2 | 7/2019 | Sumioka |
| 2003/0006722 | A1 | 1/2003 | Hayashi |
| 2012/0105155 | A1* | 5/2012 | Odagiri .................. H03K 4/06 330/207 A |
| 2016/0329836 | A1* | 11/2016 | Sumioka ................ H02N 2/142 |
| 2017/0093304 | A1 | 3/2017 | Sumioka |
| 2017/0279380 | A1 | 9/2017 | Atsuta |

FOREIGN PATENT DOCUMENTS

| | | |
|---|---|---|
| JP | 3382454 B2 | 3/2003 |
| JP | 2006-115583 A | 4/2006 |
| JP | 2017-143602 A | 8/2017 |

\* cited by examiner

VIBRATION DRIVE DEVICE CAPABLE OF SWITCHING BETWEEN FREQUENCY CONTROL AND PULSE WIDTH CONTROL, ELECTRONIC APPARATUS, AND METHOD OF CONTROLLING VIBRATION ACTUATOR

BACKGROUND OF THE INVENTION

Field of the Invention

The present invention relates to a vibration drive device, an electronic apparatus, and a method of controlling a vibration actuator.

Description of the Related Art

There is known a vibration actuator that causes a vibration element formed by joining an electromechanical energy conversion element to an elastic body to generate vibrations, by applying an AC signal of a vibration mode of the vibration element to the vibration element, causing frictional driving of a contact body (driven body) brought into contact with the vibration element to thereby obtain a driving force. There is also known an image pickup apparatus, such as a camera and a video camera, using a vibration actuator of this type for AF driving and zoom driving. It is necessary to smoothly move a lens in a zoom operation performed in the image pickup apparatus, and therefore, the vibration actuator for driving the lens is required to have controllability with which the vibration actuator stably operates at a constant drive speed. Further, there is a demand for a method of controlling the vibration actuator, which makes it possible to control power consumption during driving of the vibration actuator to a low level.

As a speed control method for the vibration actuator, there are known a method of changing a drive frequency (frequency control), a method of changing a pulse width (pulse width control), etc. For example, Japanese Patent No. 3382454 proposes a speed control method that uses frequency control for sweeping the drive frequency from a frequency remote from a resonance frequency to a frequency at which the drive speed becomes close to a target speed, and pulse width control for controlling the pulse width by fixing the drive frequency after the drive speed has reached around the target speed Japanese Laid-Open Patent Publication (Kokai) No. 2006-115583 proposes a control method of suppressing power consumption by finding a drive frequency at which the drive current becomes minimum and fixing the drive frequency to the found drive frequency, and in a case of further reducing the power consumption (reducing the drive speed), shortening the pulse width without changing the frequency. Japanese Laid-Open Patent Publication (Kokai) No. H10-146072 proposes a control method of changing the pulse width according to a power supply voltage of a switching element to thereby supply the same electric power even when the power supply voltage is changed.

However, the conventional vibration actuator control methods have a problem that the controllability becomes unstable when the speed control is switched between the frequency control and the pulse width control. Further, switching of the speed control between the frequency control and the pulse width control is required to be performed within a limited range of power consumption.

SUMMARY OF THE INVENTION

The present invention provides a vibration drive device that is capable of preventing the controllability from becoming unstable when the speed control is switched between the frequency control and the pulse width control within a limited range of electric power.

In a first aspect of the present invention, there is provided an vibration drive device including a vibration actuator having a vibration element, and a contact body in contact with the vibration element, and a controller that controls driving of the vibration actuator, wherein the controller is configured to set a gain for frequency control and a gain for pulse width control of the vibration actuator so as to prevent electric power or electric current from exceeding an electric power limit or an electric current limit, set in advance.

In a second aspect of the present invention, there is provided an electronic apparatus including a member, and a vibration drive device for moving the member, wherein the vibration drive device comprises a vibration actuator having a vibration element, and a contact body in contact with the vibration element, and a controller that controls driving of the vibration actuator, wherein the controller is configured to set a gain for frequency control and a gain for pulse width control of the vibration actuator so as to prevent electric power or electric current from exceeding an electric power limit or an electric current limit, set in advance.

In a third aspect of the present invention, there is provided a method of controlling a vibration actuator having a vibration element, and a contact body in contact with the vibration element, comprising supplying an alternating voltage to the vibration actuator, and setting a gain for frequency control and a gain for pulse width control of the vibration actuator so as to prevent electric power or electric current from exceeding an electric power limit or an electric current limit, set in advance.

According to the present invention, it is possible to prevent the controllability from becoming unstable when the speed control is switched between the frequency control and the pulse width control within a limited range of electric power.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
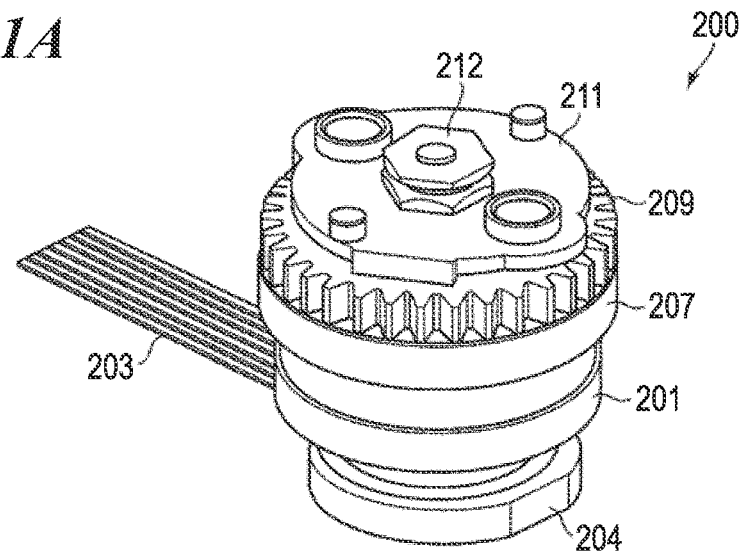
FIG. 1A is a perspective view of the appearance of an example of a vibration actuator to which a method of controlling a vibration actuator, according to the present invention, is applied.
Figure 1B:
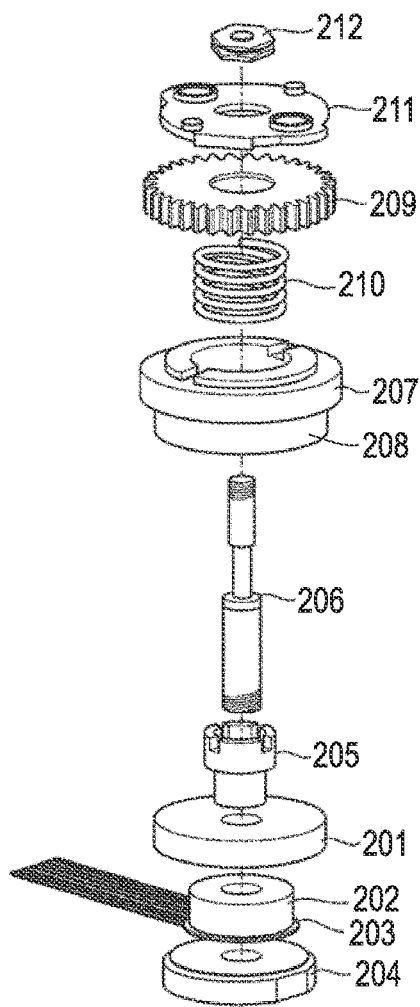
FIG. 1B is an exploded perspective view of the vibration actuator shown in FIG. 1A.

First, a description will be given of an example of a vibration actuator to which a method of controlling a vibration actuator, according to the present invention, can be applied. FIG. 1A is a perspective view of the appearance of a vibration actuator 200. FIG. 1B is an exploded perspective view of the vibration actuator 200. The vibration actuator 200 includes a first elastic body 201, a piezoelectric element 202, a flexible circuit board 203, a lower nut 204, and a second elastic body 205. Further, the vibration actuator 200 includes a shaft 206, a moving element 207, a contact spring 208, a gear 209, a coil spring 210, a fixing member 211, and an upper nut 212.

The first elastic body 201 has a plate (disc) shape and is formed of a material which is low in vibration damping loss, such as metal. The piezoelectric element 202 is an electromechanical energy conversion element. The flexible circuit board 203 is connected to a controller 300 (see FIG. 2), and applies an alternating signal to the piezoelectric element 202. The lower nut 204 is fitted on a screw portion formed on a lower end of the shaft 206. The shaft 206 is inserted through holes formed in respective central portions of the first elastic body 201, the piezoelectric element 202, the flexible circuit board 203, and the second elastic body 205. The shaft 206 has a central portion formed with a step, and this step is brought into abutment with a step formed on an inner wall of the second elastic body 205. The lower nut 204 is fitted and screwed on the screw portion formed on the tip end (lower end) of the shaft 206, whereby the second elastic body 205, the first elastic body 201, the piezoelectric element 202, and the flexible circuit board 203 are fixed.

The contact spring 208 fixed to the moving element 207 which is a contact element (driven element) is brought into contact with a surface of the first elastic body 201 on a side not in contact with the piezoelectric element 202. The contact spring 208, which has elasticity and is fixed to the moving element 207, rotates in unison with the moving element 207. The gear 209, which is rotational drive force-outputting means, allows the moving element 207 to move in a direction of a rotational axis and is fitted to the moving element 207 such that it rotates in unison with the moving element 207. The coil spring 210 is disposed between a spring receiving portion of the moving element 207 and the gear 209, and applies pressure to the moving element 207 to urge the moving element 207 downward toward the first elastic body 201. The gear 209 is rotatably supported on the fixing member 211 joined to the shaft 206, and the position of the gear 209 in an axial direction thereof is regulated by the fixing member 211. A tip end of the shaft 206 on a side not fitted with the lower nut 204 is also formed with a screw portion, and the upper nut 212 is screwed on this screw portion, whereby the fixing member 211 is fixed to the shaft 206. The fixing member 211 is formed with fixing screw holes, and it is possible to mount the vibration actuator to a desired place by fixing the fixing member 211 to the desired place with screws.

The piezoelectric element 202 is provided with a driving electrode A, not shown, for generating first bending vibration, and a driving electrode B, not shown, having a phase shifted by 90° from the first bending vibration in a direction of rotation of the moving element 207. When driving voltages (alternating voltages) which are close to a resonance frequency of a vibration element including the first elastic body 201 and the piezoelectric element 202 and are different in phase are applied to the driving electrodes A and B, respectively, vibration generating a force in the rotational direction is excited in the first elastic body 201. At this time, elliptical motion formed by combining motion in a vertical direction (axial direction) orthogonal to the rotational direction and motion in the rotational direction (horizontal direction) is generated at each of positions on the first elastic body 201 in the driving direction. By bringing the contact spring 208 into pressure contact with the surface of the first elastic body 201 in which the elliptical motion is thus excited, the contact spring 208, the moving element 207, and the gear 209 are rotated in unison by the driving force (thrust) of the elliptical motion.

Figure 2:
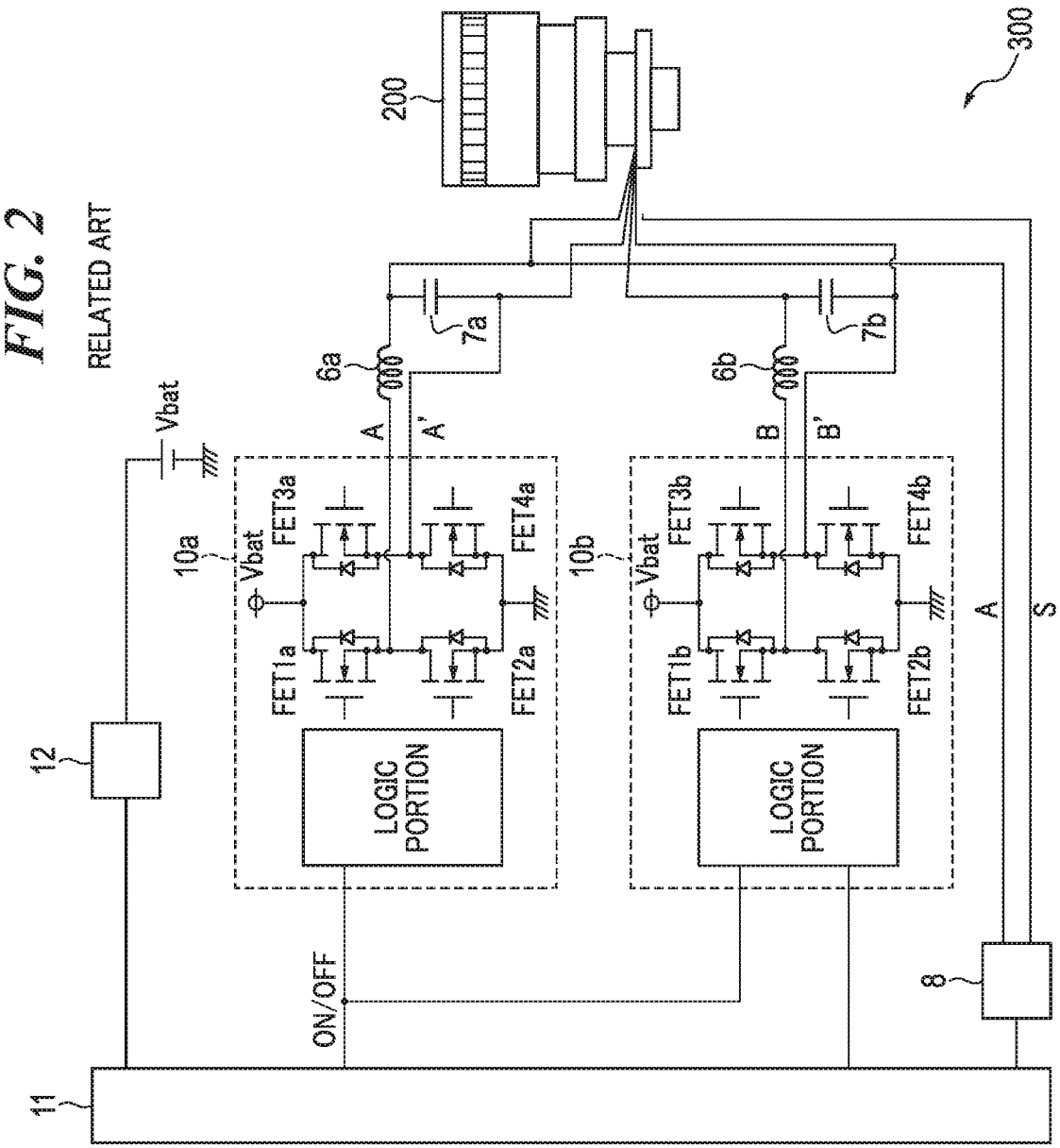
FIG. 2 is a diagram showing the configuration of a conventional vibration drive device.

Before describing vibration drive devices according to the embodiments of the present invention, the circuit configuration of a conventional controller 300 used for drive control of the vibration actuator 200 will be described. FIG. 2 is a diagram showing the configuration of a conventional vibration drive device. Note that in the present description, the vibration drive device is defined as a device including the vibration actuator 200 and the controller 300 that controls the driving of the vibration actuator 200. The controller 300 includes an MPU 11, signal generators 10a and 10b, a power supply voltage detection circuit 12, and a monitor 8.

The MPU 11 is a microcomputer that controls the overall operation of the drive device. The signal generator 10a includes an oscillator that generates pulse signals of an A mode according to a control signal (command value) delivered from the MPU 11 and a switching voltage generator that switches a DC voltage according to the pulse signals output from the oscillator. Note that in FIG. 2, the oscillator is denoted as "LOGIC PORTION". The oscillator can change a phase difference between the generated pulse signals within a range from 0° to 360°. The switching voltage generator generates switching pulses A and A' (first switching pulses) through switching of the power supply voltage (Vbat) by field effect transistors FET1a to FET4a thereof according to the pulse signals output from the oscillator. The switching pulses A and A' output from the switching voltage generator are boosted and amplified by an amplification section formed by a combination of a coil 6a and a capacitor 7a, thereby being converted to a sinusoidal driving voltage (alternating voltage), which is applied to A mode drive terminals of the vibration actuator 200.

Similarly, the signal generator 10b includes an oscillator that generates pulse signals of a B mode according to a control signal (command value) delivered from the MPU 11, and a switching voltage generator that switches a DC voltage according to the pulse signals output from the oscillator. The oscillator can change a phase difference between the pulse signals within a range from 0° to 360°. The switching voltage generator generates switching pulses B and B' (second switching pulses) through switching of the power supply voltage by field effect transistors FET1b to FET4b according to the pulse signals output from the oscillator. The switching pulses B and B' are boosted and amplified by an amplification section formed by a combination of a coil 6b and a capacitor 7b, thereby being converted to a sinusoidal driving voltage, which is applied to B mode drive terminals of the vibration actuator 200.

The power supply voltage detection circuit 12 detects the magnitude of the power supply voltage and notifies the MPU 11 of the detected value. The piezoelectric element 202 of the vibration actuator 200 is provided with a voltage detection electrode, not shown, and the monitor 8 determines a phase difference between the driving voltage obtained by amplifying the switching pulse A and a voltage signal S output from the voltage detection electrode to thereby monitor a state of resonance in the vibration actuator 200. The MPU 11 controls a driving condition according to the power supply voltage detected by the power supply voltage detection circuit 12 and the state of resonance detected by the monitor 8 e.g. by changing the pulse widths (duty ratios) of the pulse signals generated by the oscillators so as not to make power consumption too large.

Note that the pulse widths of pulse signals generated by the respective oscillators of the signal generators 10a and 10b are equal to the pulse widths of the switching pulses A, A', B, and B'. Further, the duty ratios of the switching pulses A, A', B, and B' are equal to the duty ratios of the pulse signals generated by the respective oscillators of the signal generators 10a and 10b. Note that in this description, the duty ratio of each of the switching pulses output from the signal generators 10a and 10b is a ratio of an on-time to one period (on-time+off-time) of the switching pulse. Therefore, in this description, the "duty ratio" is not used to mean a ratio between a time period in which the vibration actuator 200 is on (driven) and a time period in which the vibration actuator 200 is off (stopped).

Figure 3:
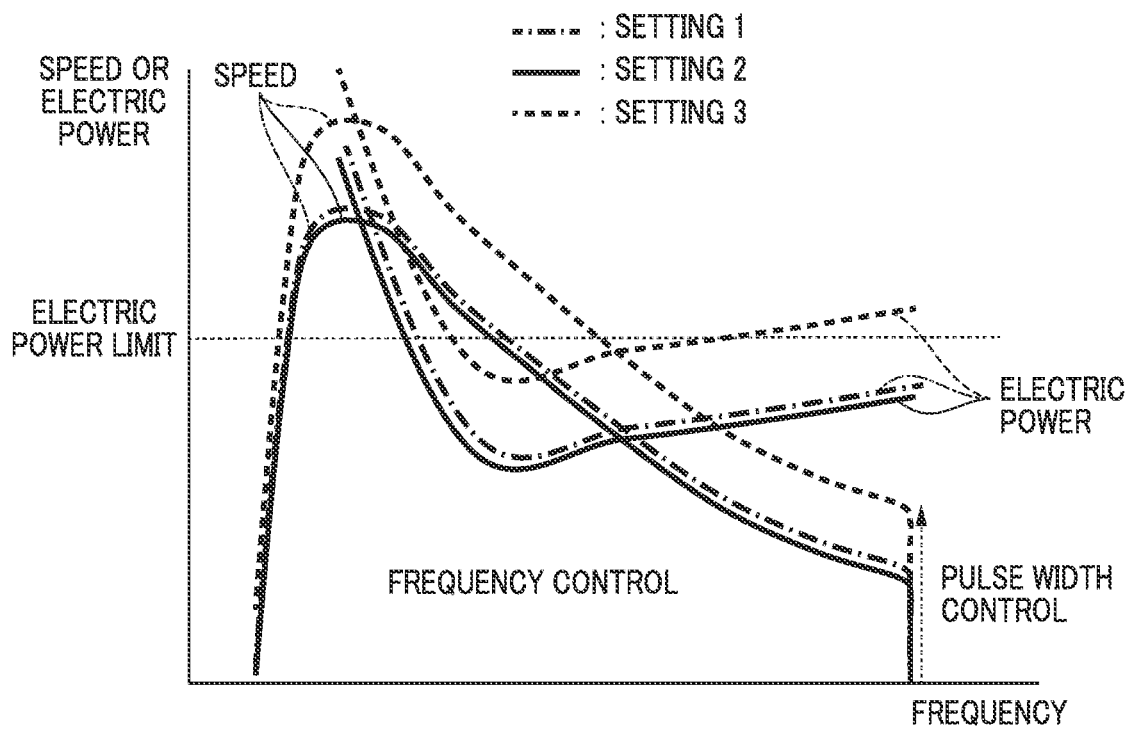
FIG. 3 is a diagram useful in explaining frequency-speed characteristics and electric power-frequency characteristics, exhibited when driving the vibration actuator using a controller appearing in FIG. 2.

FIG. 3 is a diagram showing frequency-speed characteristics and electric power-frequency characteristics of the vibration drive device shown in FIG. 2 using a combination of the power supply voltage and the duty ratio (25%, 50%) of the switching pulse. In a region of the frequency control, the characteristics between electric power input to the vibration actuator 200 and the frequency control are prevented from being changed when the power supply voltage is different. To this end, in a case where the power supply voltage is large (high), the duty ratio of the switching pulse is set to 25% (setting 1), whereas in a case where the power supply voltage is small (low), the duty ratio of the switching pulse is set to 50% (setting 2). Note that if the duty ratio of the switching pulse is set to 50% in a case where the power supply voltage is large (setting 3), the input electric power becomes too large, making the frequency-speed characteristics and the electric power-frequency characteristics much different from those detected in the case of the settings 1 and 2. For this reason, in the case where the power supply voltage is large, the duty ratio of the switching pulse is set to 25%.

If the drive frequency is made too high in a case where the drive frequency is progressively increased to reduce the drive speed of the vibration actuator 200, the drive frequency enters a region where electric power is increased. This is also described in Japanese Laid-Open Patent Publication (Kokai) No. 2006-115583. To prevent this, the upper limit of the drive frequency is specified to a predetermined frequency so as to prevent electric power from exceeding an electric power limit. In a case where the detected speed is higher than a target speed even at the predetermined frequency, pulse width control is performed by fixing the drive frequency, such that the duty ratio of the switching pulse is reduced. In a case where the power supply voltage is large, the pulse width control is performed such that the maximum duty ratio of the switching pulse at a time when the speed control is switched from the frequency control to the pulse width control is set to 25% and the duty ratio of the switching pulse is controlled within a range of 25% to 0%. On the other hand, in a case where the power supply voltage is small, the pulse width control is performed such that the maximum duty ratio of the switching pulse at a time when the speed control is switched from the frequency control to the pulse width control is set to 50% and the duty ratio of the switching pulse is controlled within a range of 50% to 0%.

Figure 4:
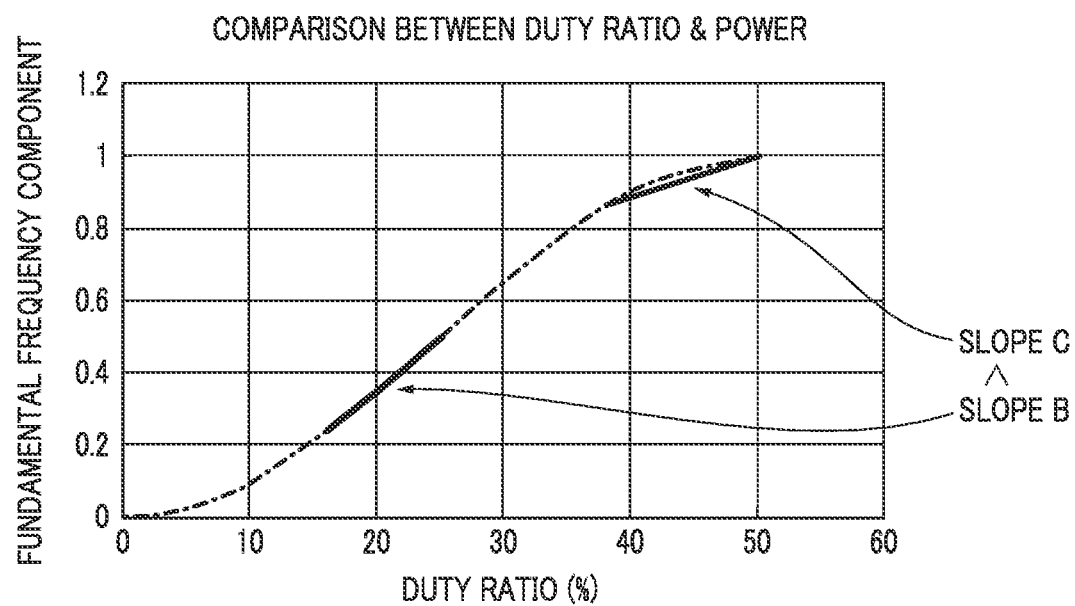
FIG. 4 is a diagram showing a relationship between the duty ratio of a switching pulse and a fundamental frequency component.

FIG. 4 is a diagram showing a relationship between the duty ratio of the switching pulse and a fundamental frequency component (Power). The fundamental frequency component changes little when the duty ratio is approximately 50%, and a slope C indicative of a rate of change of the fundamental frequency component with respect to the duty ratio is small. The fundamental frequency component changes much when the duty ratio is approximately 25% and hence a slope B indicative of a rate of change of the fundamental frequency component with respect to the duty ratio is large, compared with the case where the duty ratio is at approximately 50%. The relationship described above holds between the duty ratio and the fundamental frequency component, and hence if the duty ratio of the switching pulse at a time when the speed control is changed from the frequency control to the pulse width control is large, a change in the drive speed of the vibration actuator 200 at a time when the duty ratio is changed becomes small. In other words, this is equivalent to a gain of the driving voltage applied to the vibration actuator 200 being small. Therefore, if the gain for a time when the speed control is changed from the frequency control to the pulse width control is set assuming that the duty ratio of the switching pulse is 25%, the gain becomes small when the speed control is changed at a larger duty ratio, which lowers the controllability. This will be described in detail hereinafter with reference to FIG.

9A. Now, the vibration drive device according to the embodiments of the present invention, which is capable of solving this problem, will be described.

Figure 5:
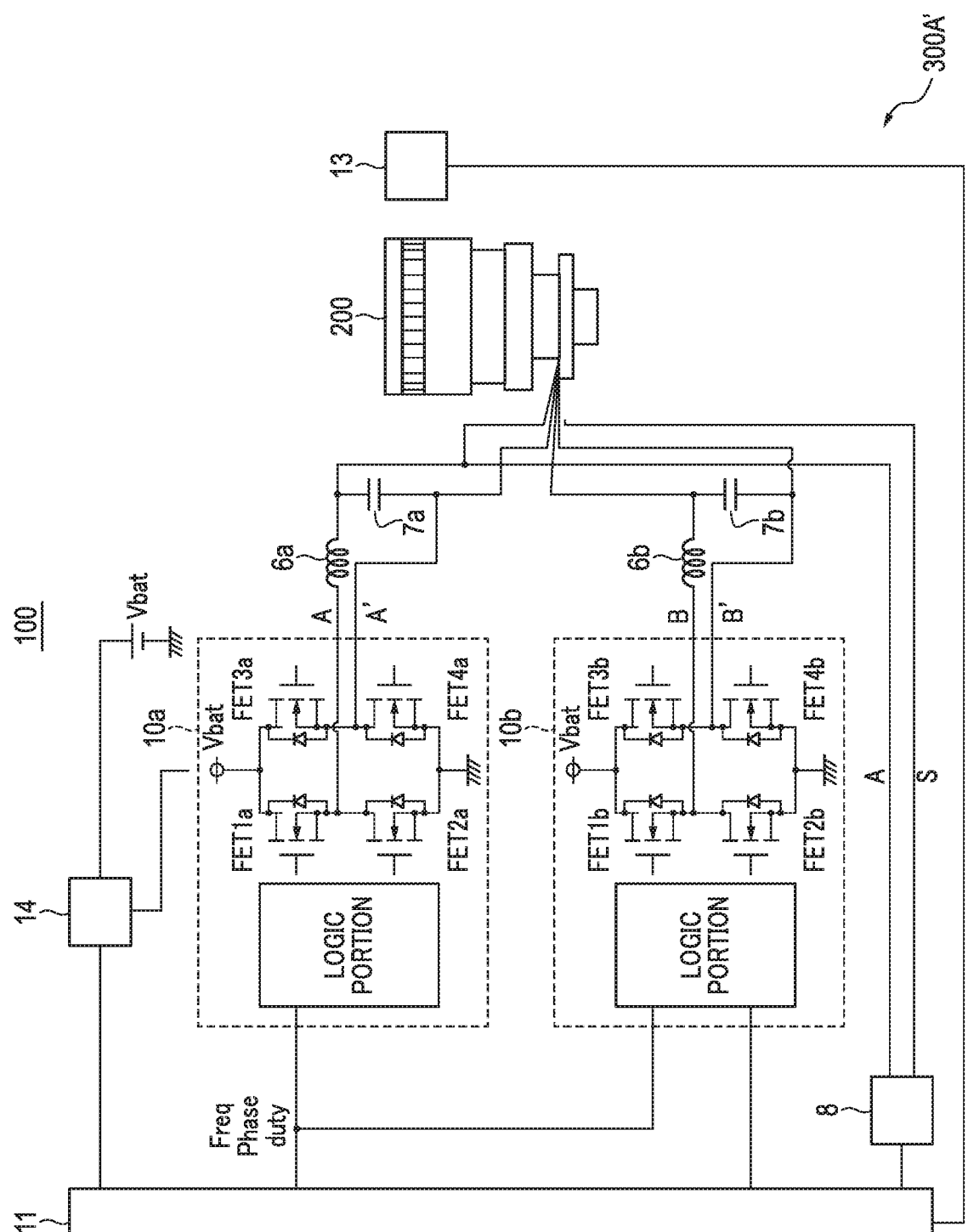
FIG. 5 is a diagram showing the configuration of a vibration drive device according to a first embodiment.

First, a first embodiment of the present invention will be described. FIG. 5 is a diagram showing the configuration of the vibration drive device, denoted by reference numeral 100, according to the first embodiment. The vibration drive device 100 includes the vibration actuator 200 and a controller 300' that controls driving of the vibration actuator 200. Note that in FIG. 5, the same component elements of the controller 300' which is a component of the vibration drive device 100 as those of the controller 300 appearing in FIG. 2 are denoted by the same reference numerals, and description thereof is omitted.

The controller 300' appearing in FIG. 5 differs from the controller 300 appearing in FIG. 2 in that an electric power detection circuit 14 is provided in place of the power supply voltage detection circuit 12 included in the controller 300 appearing in FIG. 2, and a position detection section 13 which is not included in the controller 300 appearing in FIG. 2 is further provided. Further, the MPU 11 of the controller 300' appearing in FIG. 5 differs from the MPU 11 of the controller 300 appearing in FIG. 2 in the control to be executed due to the above-mentioned difference in configuration. The details of the difference will be described hereafter.

The position detection section 13 is formed e.g. by a photo interrupter and a slit plate, and detects a rotational position of the moving element 207 (rotation section). The MPU 11 calculates the rotational position and the speed (drive speed (rotational speed)) of the moving element 207 based on an output signal from the position detection section 13 and controls the rotational position and the drive speed of the moving element 207. More specifically, the MPU 11 generates, based on the rotational position and the drive speed of the moving element 207, a control signal (command value) for controlling the drive speed, using a switching frequency, a switching pulse width, a phase difference between switching pulses, etc., as parameters. The signal generators 10a and 10b generate the switching pulses A, A', B, and B' based on the control signal generated by the MPU 11. The switching pulses A, A', B, and B' are converted to sinusoidal driving voltages by the amplification section and then applied to the vibration actuator 200.

The electric power detection circuit 14 is provided assuming a case where the vibration drive device 100 is equipped in a portable electronic apparatus which can be carried, and further, assuming that in such an electronic apparatus, a secondary battery or the like is often used as a power supply. In general, in a battery, although supply voltage is large at first in a case where the battery is used after completion of charging or from an unused state, the supply voltage is progressively reduced with the lapse of use time. The electric power detection circuit 14 is connected to a DC power supply to detect a power supply voltage which is a DC voltage and is further connected to the signal generators 10a and 10b to detect electric power (or electric current) consumed by switching circuits thereof (used for generating switching pulses). The MPU 11 can perform control e.g. for urgently stopping the operation of the vibration drive device 100 when marked reduction of the power supply voltage or an abnormality in electric power (electric current) consumed by the signal generators 10a and 10b is detected based on a detection signal output from the electric power detection circuit 14.

Figure 6A:
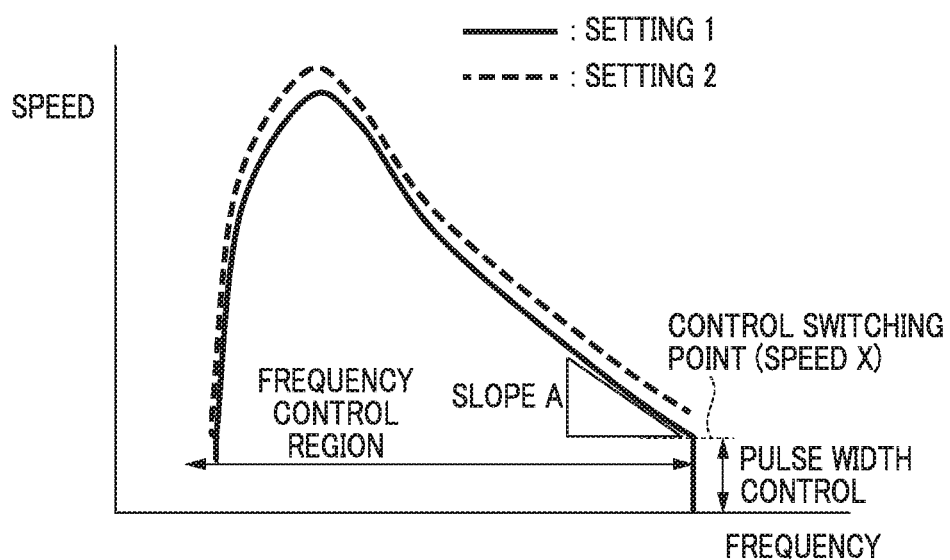
FIG. 6A is a diagram useful in explaining frequency-speed characteristics exhibited when driving a vibration actuator using a controller of the first embodiment.

FIG. 6A is a diagram showing frequency-speed characteristics of the vibration drive device 100. Similar to FIG. 3, FIG. 6A shows two respective combinations of power supply voltages (large and small) and duty ratios (25% and 50%) of the switching pulse output from each of the signal generators 10a and 10b. Note that the settings 1 and 2 are the same as settings 1 and 2, described with reference to FIG. 3. More specifically, in the setting 1, assuming a case where the power supply voltage is large, the duty ratio of the switching pulse is set to 25%, and in the setting 2, assuming a case where the power supply voltage is small, the duty ratio of the switching pulse is set to 50%. Note that, as described hereinabove with reference to FIG. 3, if the duty ratio of the switching pulse is set to 50% in a case where the power supply voltage is large, the input electric power becomes too large, and hence the duty ratio of the switching pulse is set to 25% in the case where the power supply voltage is large. With this, as shown in FIG. 6A, the setting 1 and the setting 2 show the similar characteristics curves.

Even when the power supply voltage is large, by reducing the duty ratio of the switching pulse, a rate of change of the drive speed with respect to the frequency, which is indicated by a slope A, becomes similar to the case where the power supply voltage is small. In other words, it is known that in a region of the frequency control, by setting the duty ratio of the switching pulse according to the value of the power supply voltage, it is possible to obtain the same frequency-speed characteristics. Note that although in the frequency control, the frequency (period) of the switching pulse is swept, the duty ratio of the switching pulse at that time is unchanged. When reducing the target speed, the drive frequency is progressively increased, but to avoid increase in electric power, the drive frequency is fixed to a frequency at which the drive speed becomes equal to a predetermined speed X (hereinafter referred to as the "control switching point"), and when desired to further reduce the drive speed, the pulse width control is performed.

Figure 6B:
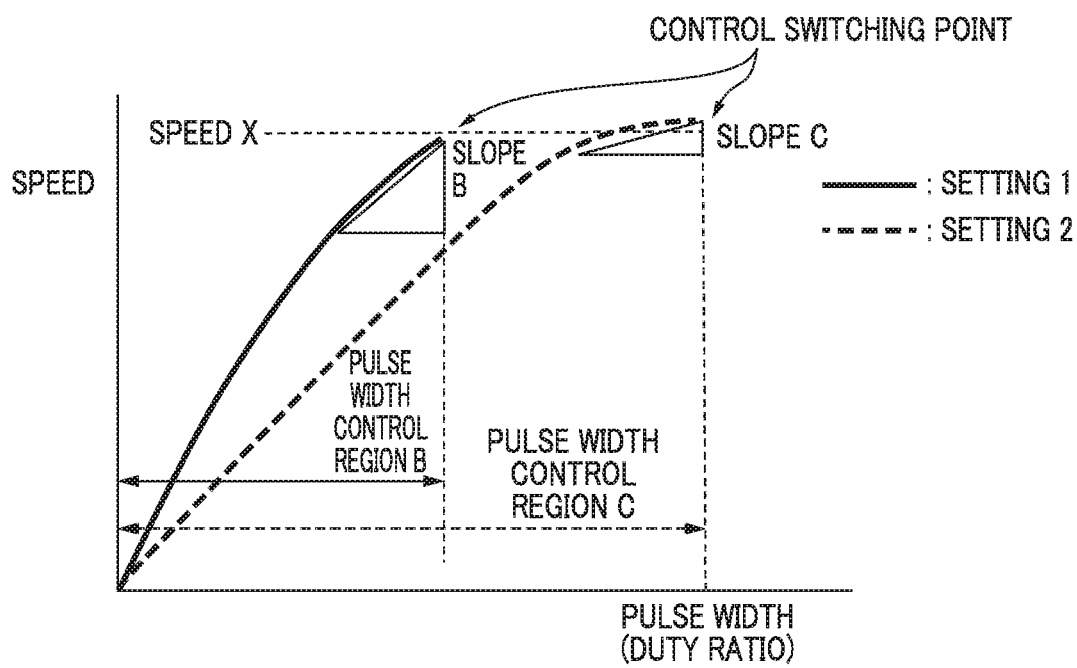
FIG. 6B is a diagram useful in explaining pulse width-speed characteristics exhibited when driving the vibration actuator using the controller of the first embodiment.

FIG. 6B is a diagram useful in explaining a relationship between the duty ratio of the switching pulse and the drive speed after the speed control is switched from the frequency control to the pulse width control. In the pulse width control, the frequency of the switching pulse is fixed and the duty ratio of the switching pulse is changed (i.e., the pulse width corresponding to the on-time in one period is changed without changing the period of the switching pulse). Since the drive frequency is fixed to the frequency at which the drive speed becomes equal to the speed X, the large/small relation of duty ratios of the switching pulse can be treated similarly to the large/small relation of pulse widths of the switching pulse.

Referring to FIG. 6B, a pulse width control region B indicates a range in which the pulse width (duty ratio) can be set by the setting 1 and a pulse width control region C indicates a range in which the pulse width (duty ratio) can be set by the setting 2. The setting 1 and the setting 2 differ from each other in the value of the maximum duty ratio at the control switching point. The reason for this is as follows: As shown in the relationship between the duty ratio of the switching pulse and the fundamental frequency component (Power) in FIG. 4, the fundamental frequency component changes little when the duty ratio is approximately 50% and the slope C is small. On the other hand, the fundamental frequency component changes more largely when the duty ratio of the switching pulse is approximately 25% than the case where the duty ratio is approximately 50%, and therefore, the slope B is larger than the slope C. In a case where the maximum duty ratio is determined based on a value of the power supply voltage and the duty ratio is changed within a range smaller than the determined value of the maximum duty ratio, when the power supply voltage is "large", the maximum duty ratio is set to 25%, and hence the rate of change of the drive speed (slope B) with respect to the duty ratio is large. Inversely, in a case where the power supply voltage is "small", the maximum duty ratio is set to 50% and hence the rate of change of the drive speed (slope C) with respect to the duty ratio is small. Therefore, although the rate of change of the drive speed in the frequency control is the same as indicated by the slope A even when the power supply voltage is different, when the speed control is changed from the frequency control to the pulse width control, the slope in the pulse width control is different as indicated by the relationship of the slope B>the slope C. In view of this, in the present embodiment, this relationship is improved by the control described as follows.

Figure 7A:
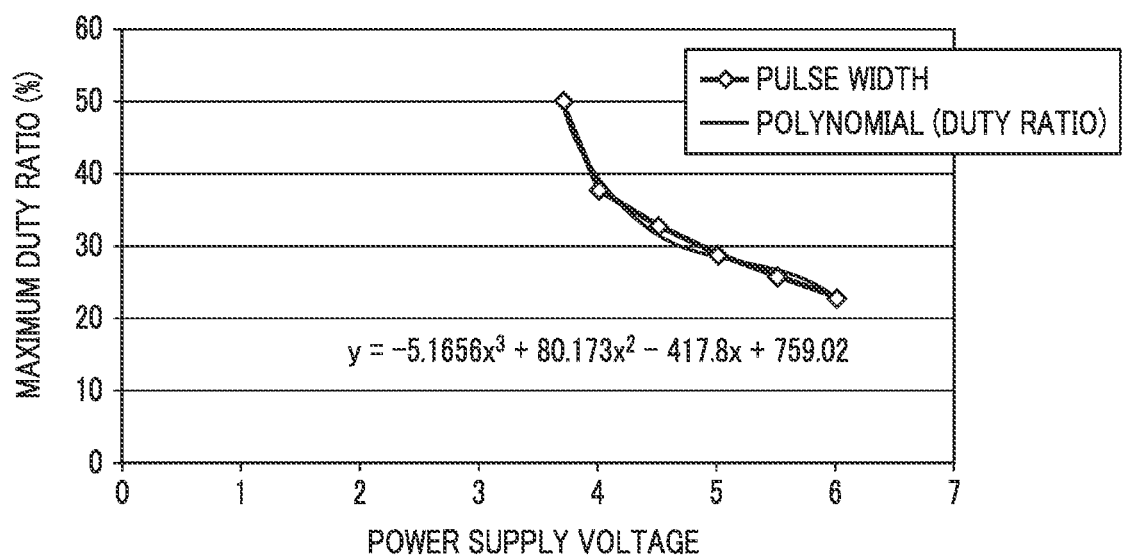
FIG. 7A is a graph showing an example of setting of the maximum duty ratio of a switching pulse with respect to a power supply voltage at each of control switching points.

FIG. 7A is a graph showing an example of setting of the maximum duty ratio of a switching pulse with respect to a power supply voltage at each of control switching points. The power supply voltage is a voltage of a battery used for driving the vibration actuator 200, and varies within a range of 3.7 V to 6.0 V. Note that the data shown in FIG. 7A is obtained by measuring the relationship between the power supply voltage and the maximum duty ratio in a state configured such that the speed X is obtained at the control switching frequency. A polynomial in FIG. 7A will be described when a flowchart in FIG. 8 (algorithm for controlling the vibration actuator 200) is described.

Figure 7B:
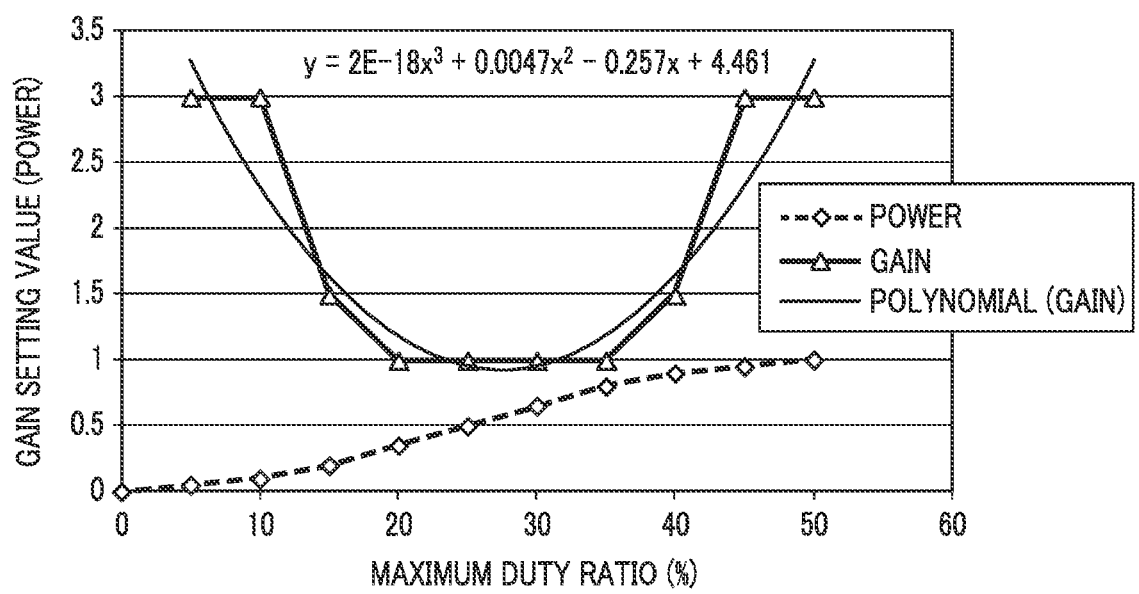
FIG. 7B is a graph showing a relationship between the maximum duty ratio and a gain during pulse width control.

FIG. 7B is a graph showing a relationship between the set maximum duty ratio and a gain setting when the pulse width control is performed. In FIG. 7B, there is shown a gain setting value applied so as to switch between the frequency control and the pulse width control smoothly (in a manner suppressing lowering of the controllability) when the maximum duty ratio is determined based on the relationship shown in FIG. 7A. Note that in FIG. 7B, a gain for making the relationship between the operation amount and the drive speed substantially the same between the frequency control and the pulse width control in a case where the maximum duty ratio is 35% is set to "1". When the gain is increased, the duty ratio of the switching pulses (pulse signals output from the respective oscillators of the signal generators 10a and 10b) largely reacts (changes) to a change in the drive speed. A polynomial in FIG. 7B will be described when the flowchart in FIG. 8 is described.

Figure 8:
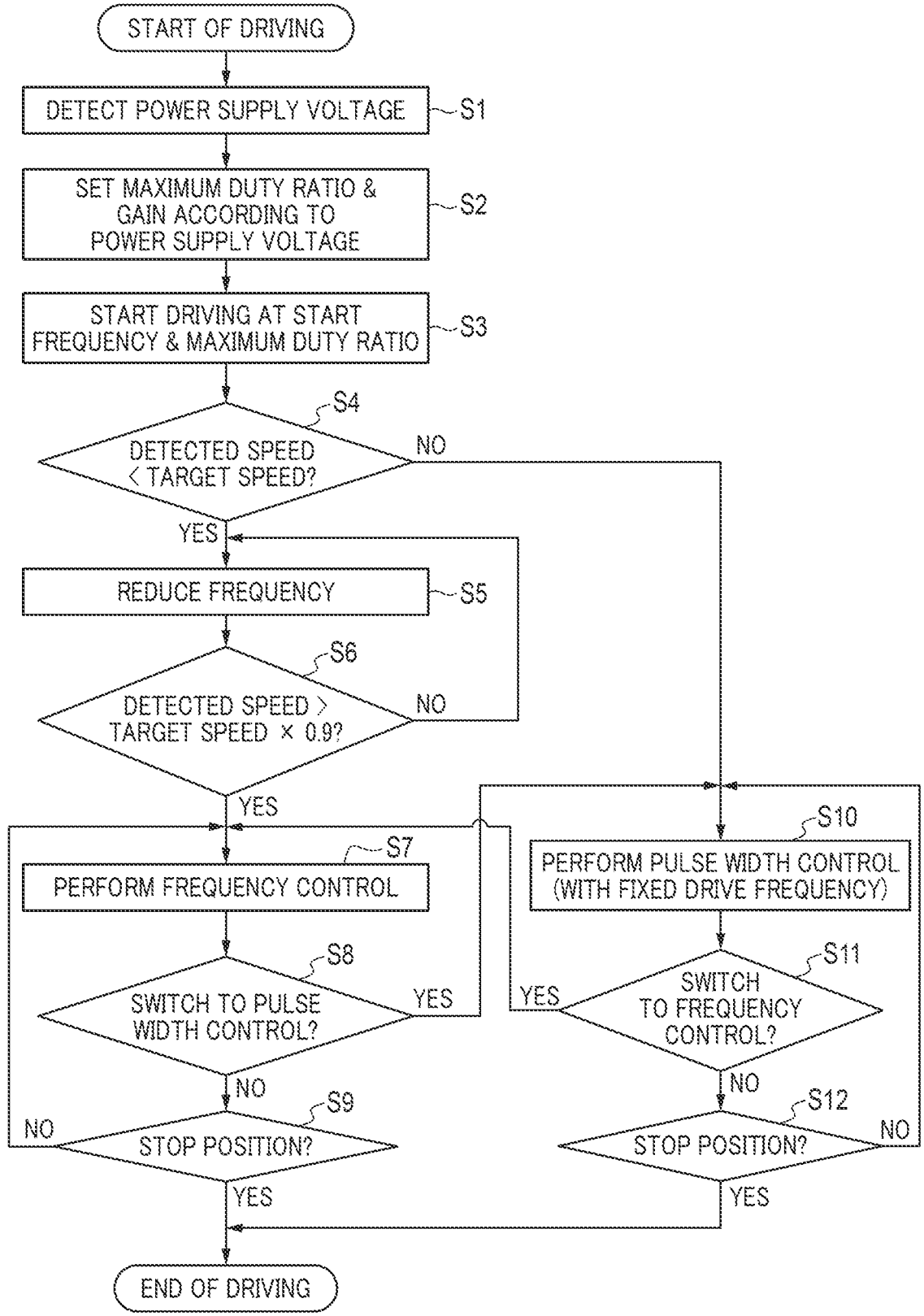
FIG. 8 is a flowchart useful in explaining a method of controlling the vibration actuator in the first embodiment.

FIG. 8 is a flowchart useful in explaining the method of controlling the vibration actuator 200, according to the first embodiment, by the MPU 11. Processing operations (steps) indicated by step numbers in FIG. 8 are realized by the MPU 11 that performs the overall control of the vibration drive device 100 by executing a predetermined program.

Note that before the start of driving of the vibration actuator 200, the MPU 11 acquires the relationship between the power supply voltage and the maximum duty ratio, shown in FIG. 7A, and the relationship between the maximum duty ratio and the gain setting in the pulse width control, shown in FIG. 7B. The MPU 11 stores these relationships in a memory included in the MPU 11 as tables or stores mathematical expressions formed by converting the relationship between the power supply voltage and the maximum duty ratio in the memory. For example, the data items in FIGS. 7A and 7B can be converted to the following equations (1) and (2) appearing in FIGS. 7A and 7B, respectively:

$$y = -5.1656x^3 + 80.173x^2 - 417.8x + 759.02 \quad (1)$$

$$y = 2 \times 10^{-18}x^3 + 0.0047x^2 - 0.257x + 4.461 \quad (2)$$

In a step S1, the MPU 11 detects a power supply voltage using the electric power detection circuit 14. In a step S2, the MPU 11 determines and sets the maximum duty ratio of the switching pulse and the gain using the tables or the mathematical expressions, corresponding to FIGS. 7A and 7B, based on the power supply voltage obtained in the step S1. In the next step S3, the MPU 11 starts driving of the vibration actuator 200 at the maximum duty ratio set in the step S2 and a start frequency set in advance. Note that the start frequency is set in advance, and hence determining the maximum duty ratio in the step S2 is equivalent to determining the pulse width (on-time in one period) at the start frequency. In a step S4, the MPU 11 determines, based on the output signal from the position detection section 13, whether or not a detected speed (drive speed (rotational speed) of the moving element 207) is lower than a target speed. If it is determined that the detected speed is lower than the target speed (YES to the step S4), the MPU 11 proceeds to a step S5, whereas if it is determined that the detected speed is not lower than the target speed (NO to the step S4), the MPU 11 proceeds to a step S10.

In the step S5, the MPU 11 performs the frequency control for reducing the drive frequency such that the detected speed is increased. In a step S6, the MPU 11 determines whether or not the detected speed has exceeded 90% of the target speed, i.e., whether or not the detected speed has come close to the target speed. Here, the determination reference is set to 90%, but it is not limited to this value. If it is determined that the detected speed has not exceeded 90% of the target speed (NO to the step S6), the MPU 11 returns to the step S5, whereas if it is determined that the detected speed has exceeded 90% of the target speed (YES to the step S6), the MPU 11 proceeds to a step S7.

In the step S7, the MPU 11 performs the frequency control for changing the drive frequency according to a difference between the detected speed of the moving element 207 and the target speed such that the detected speed comes close to the target speed. In a step S8, the MPU 11 determines whether or not to switch the speed control from the frequency control to the pulse width control. In the step S7, if the detected speed has exceeded the target speed, the detected speed is reduced by increasing the drive frequency, and the determination in the step S8 is performed based on whether or not the drive frequency has reached the start frequency as a result of execution of the step S7. If it is determined that the drive frequency has reached the start frequency, the MPU 11 fixes the drive frequency to the start frequency, and proceeds to the step S10 to switch the speed control from the frequency control to the pulse width control (YES to the step S8). On the other hand, if it is determined that the drive frequency has not reached the start frequency, the MPU 11 proceeds to a step S9 to continue the frequency control (NO to the step S8).

In the step S9, the MPU 11 continues the frequency control and determines, based on the signal output from the position detection section 13, whether or not the moving element 207 has reached the stop position. If it is determined that the moving element 207 has not reached the stop position (NO to the step S9), the MPU 11 returns to the step S7, whereas if the moving element 207 has reached the stop position (YES to the step S9), the MPU 11 stops the driving of the vibration actuator 200, followed by terminating the present process.

In the step S10, the MPU 11 switches the speed control from the frequency control to the pulse width control and performs the pulse width control. In the pulse width control in the step S10, the drive frequency is fixed to the start frequency, and when the detected speed is small, the duty ratio of the switching pulse is increased, whereas when the detected speed is large, it is reduced. Note that the gain set in the pulse width control in the step S10 is a value set in the step S2 according to the maximum duty ratio set in the step S2.

In a step S11, the MPU 11 determines whether or not to switch the speed control from the pulse width control to the frequency control. This is because it is necessary to switch the speed control to the frequency control in a case where the detected speed is lower than the target speed even when the duty ratio of the switching pulse reaches the maximum duty ratio during execution of the pulse width control. Thus, the duty ratio of the switching pulse at a time when the speed control is switched from the pulse width control to the frequency control is fixed to the maximum duty ratio. If it is determined that it is necessary to switch the speed control from the pulse width control to the frequency control (YES to the step 11), the MPU 11 returns to the step S7, whereas if it is determined that it is unnecessary to switch the speed control from the pulse width control to the frequency control (NO to the step 11), the MPU 11 proceeds to a step S12.

In the step S12, the MPU 11 continues the pulse width control and determines, based on the signal output from the position detection section 13, whether or not the moving element 207 has reached the stop position. If it is determined that the moving element 207 has not reached the stop position (NO to the step S12), the MPU 11 returns to the step S10, whereas if the moving element 207 has reached the stop position (YES to the step S12), the MPU 11 stops the driving of the vibration actuator 200, followed by terminating the present process.

As described above, according to the vibration drive device 100 (controller 300' appearing in FIG. 5), the maximum duty ratio of the switching pulse is set according to the power supply voltage, and the gain for the pulse width control is set according to the set maximum duty ratio. With this, even when the speed control is switched between the frequency control and the pulse width control, it is possible to smoothly execute the speed control in a wide range from a high speed to a low speed.

Figure 9A:
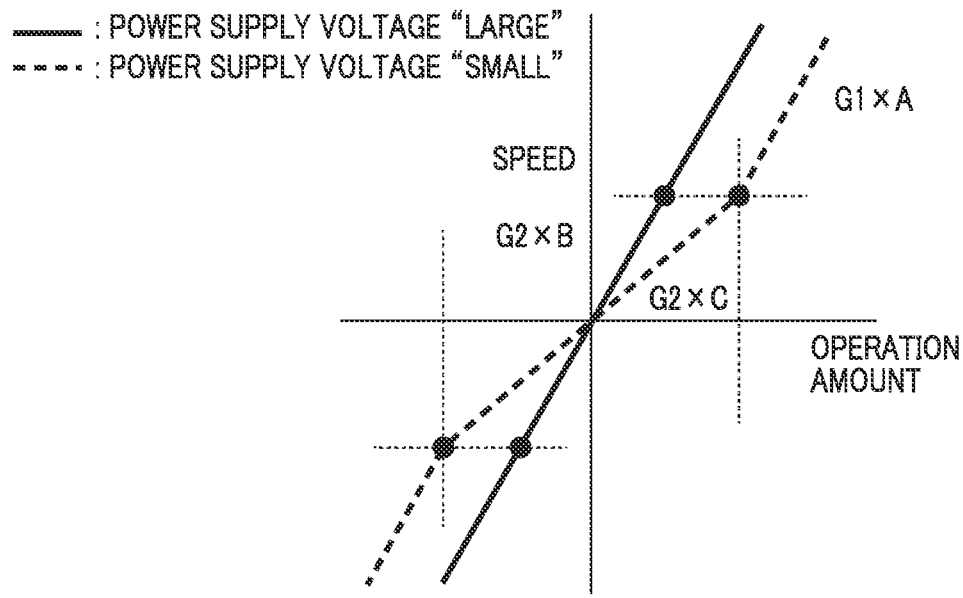
FIG. 9A is a schematic diagram useful in explaining how the drive speed changes when the frequency control and pulse width control of the vibration actuator are switched by the conventional control method.
Figure 9B:
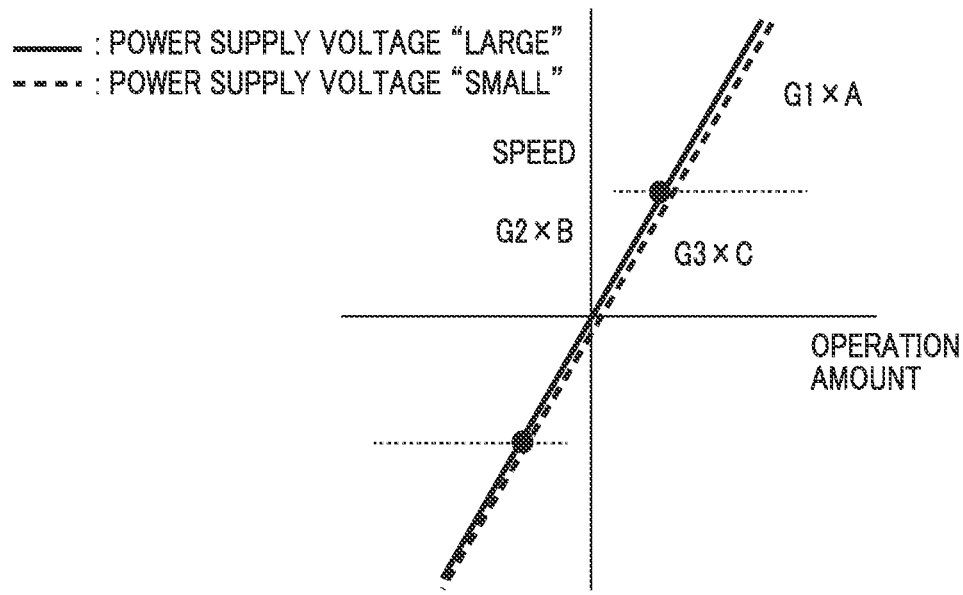
FIG. 9B is a schematic diagram useful in explaining how the drive speed changes when the frequency control and pulse width control of the vibration actuator are switched by the control method according to the first embodiment.

FIGS. 9A and 9B are schematic diagrams useful in explaining how the drive speed changes when the speed control of the vibration actuator 200 is switched between the frequency control and the pulse width control. FIG. 9A is a diagram useful in explaining the conventional control method, whereas FIG. 9B is a diagram useful in explaining the control method according to the present embodiment, described with reference to FIGS. 7 and 8. In FIGS. 9A and 9B, the horizontal axis represents an operation amount calculated from a speed difference and the vertical axis represents the drive speed of the moving element 207 of the vibration actuator 200. Further, black circles in FIGS. 9A and 9B each indicate a point where the speed control is switched between the frequency control and the pulse width control.

FIG. 9A shows a state in which in a case where the power supply voltage is "large", a product of the slope A and a gain G1 (first gain) in the frequency control is equal to a product of the slope B and a gain G2 (second gain) in the pulse width control. When the gains G1 and G2 are set such that G1×A=G2×B holds, the slope of a solid line indicative of a rate of change of the drive speed with respect to the operation amount does not change at control switching points. That is, the control characteristics do not change and hence the smooth control is performed. However, in a case where the power supply voltage is "small", the slope C in the pulse width control is smaller than the slope B in the case where the power supply voltage is "large", and hence if the control is performed using the same gain G2, G1×A>G2×C holds, so that the control characteristics change at the control switching points, as indicated by a broken line.

FIG. 9B shows a state in which the product of the slope A and the gain G1 in the frequency control and the product of the slope B and the gain G2 in the pulse width control in the case where the power supply voltage is "large" are equal to a product of the slope C and a gain G3 (third gain) in the pulse width control in a case where the power supply voltage is "small". Note that the slope in the frequency control in the case where the power supply voltage is "small" is the same as the slope A in the frequency control in the case where the power supply voltage is "large" (see FIG. 6A). As mentioned above, when the gains G1 to G3 are set such that A×G1=B×G2=C×G3 holds, the rate of change of the drive speed with respect to the operation amount (slopes of the solid line and the broken line indicative of the respective cases where the power supply voltage is "large" and "small") becomes the same. Therefore, it is possible to realize the smooth control in which the control characteristics do not change at each control switching point even when the power supply voltage changes.

Figure 10:
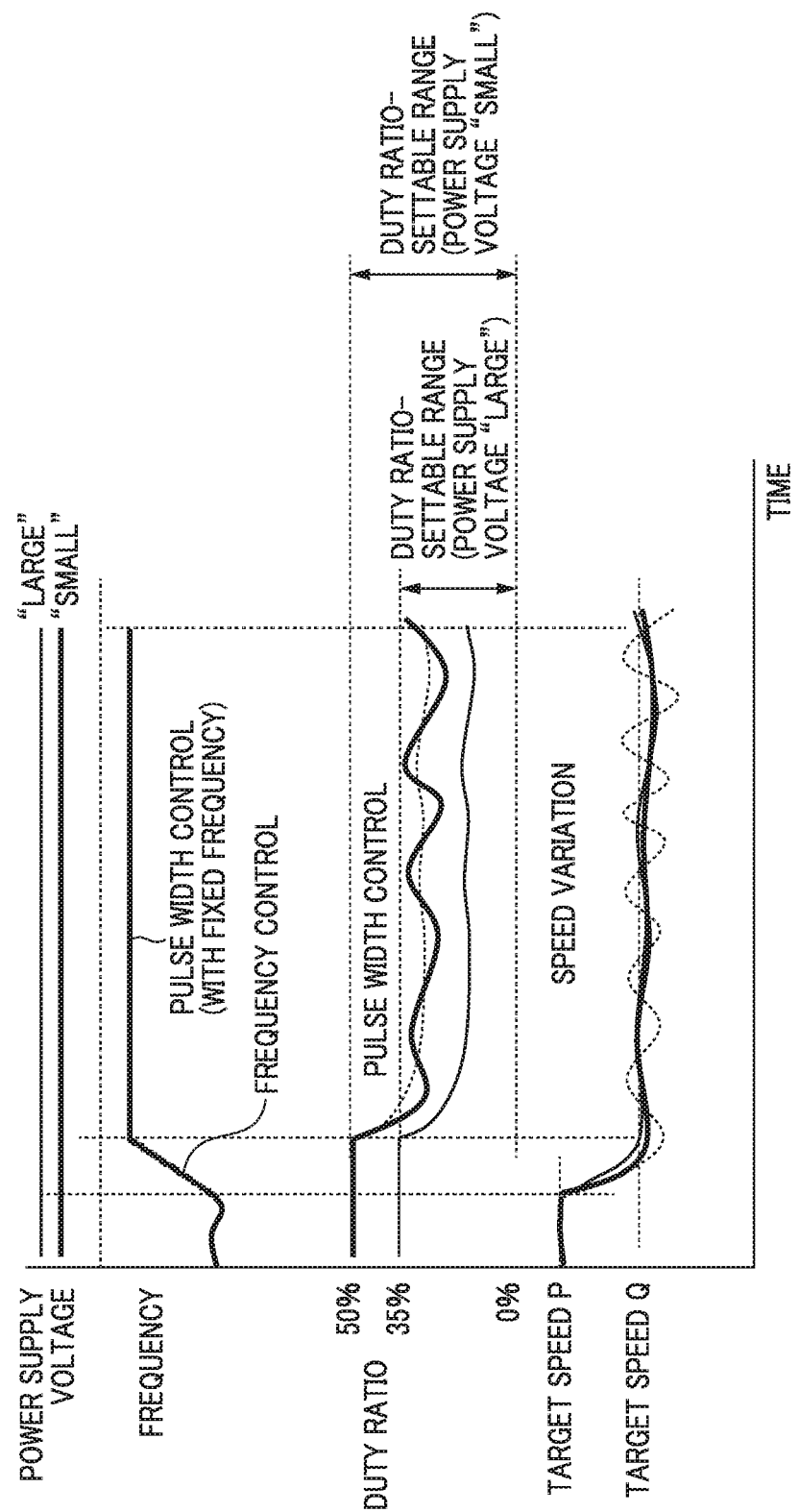
FIG. 10 is a diagram showing changes in control parameters, exhibited when a target speed is changed during drive control of the vibration actuator.

FIG. 10 is a diagram showing changes in the control parameters, exhibited when the target speed is changed from a target speed P to a target speed Q during the drive control of the vibration actuator 200. In FIG. 10, the maximum duty ratio at a time when the power supply voltage is "small" is set to 50%, and the maximum duty ratio at a time when the power supply voltage is "large" is set to 35%. Therefore, a range in which the duty ratio of the switching pulse can be set in the case where the power supply voltage is "small" is a range from 50% to 0%, and a range in which the duty ratio of the switching pulse can be set in the case where the power supply voltage is "large" is a range from 35% to 0%. The speed control is changed from the frequency control to the pulse width control in accordance with the change of the target speed from the target speed P to the target speed Q, and the case where the power supply voltage is "large" is indicated by a thin solid line, and the case where the power supply voltage is "small" is indicated by a thick solid line. Further, the control in a case where the power supply voltage is "small" and the gain is not set to a proper value is indicated by a thin broken line.

When the power supply voltage is "large", the duty ratio of the pulse signal is set to 35% which is the maximum duty ratio and the gain is set such that the rate of change of the drive speed with respect to the operation amount does not change even when the speed control is shifted from the frequency control to the pulse width control in accordance with the change of the target speed. Therefore, as indicated by the thin solid line, the target speed is changed from the target speed P to the target speed Q and the drive speed is substantially constantly controlled to the target speed Q without increasing variation in speed.

When the power supply voltage is "small", the duty ratio of the switching pulse is set to 50% which is the maximum duty ratio. If the gain at this time is set to the same gain used when the power supply voltage is "large", the rate of change of the drive speed with respect to the operation amount is reduced when the speed control is shifted from the frequency control to the pulse width control in accordance with the change of the target speed from the target speed P to the target speed Q, resulting in a state in which the control gain is insufficient. This state is indicated by the thin broken line, in which the drive speed does not stably follow up the target speed, which increases variation in speed. To solve this problem, when the power supply voltage is "small" and the duty ratio of the switching pulse is 50%, the gain is set to a larger value than when the power supply voltage is "large", to thereby prevent the rate of change of the drive speed with respect to the operation amount from being changed. When the gain is increased, the duty ratio of the switching pulse (pulse signals output from the respective oscillators of the signal generators 10a and 10b) largely reacts (changes) to the change in drive speed, whereby variation in drive speed is reduced, as indicated by the thick solid line. In short, the drive speed is constantly controlled substantially to the target speed Q.

Next, a description will be given of a second embodiment of the present invention. Although in the first embodiment, the maximum duty ratio of the switching pulse is fixed according to the power supply voltage, in the second embodiment, the maximum duty ratio of the switching pulse is set based on electric power detected when the vibration actuator 200 is started, such that the electric power does not exceed an electric power limit.

Figure 11:
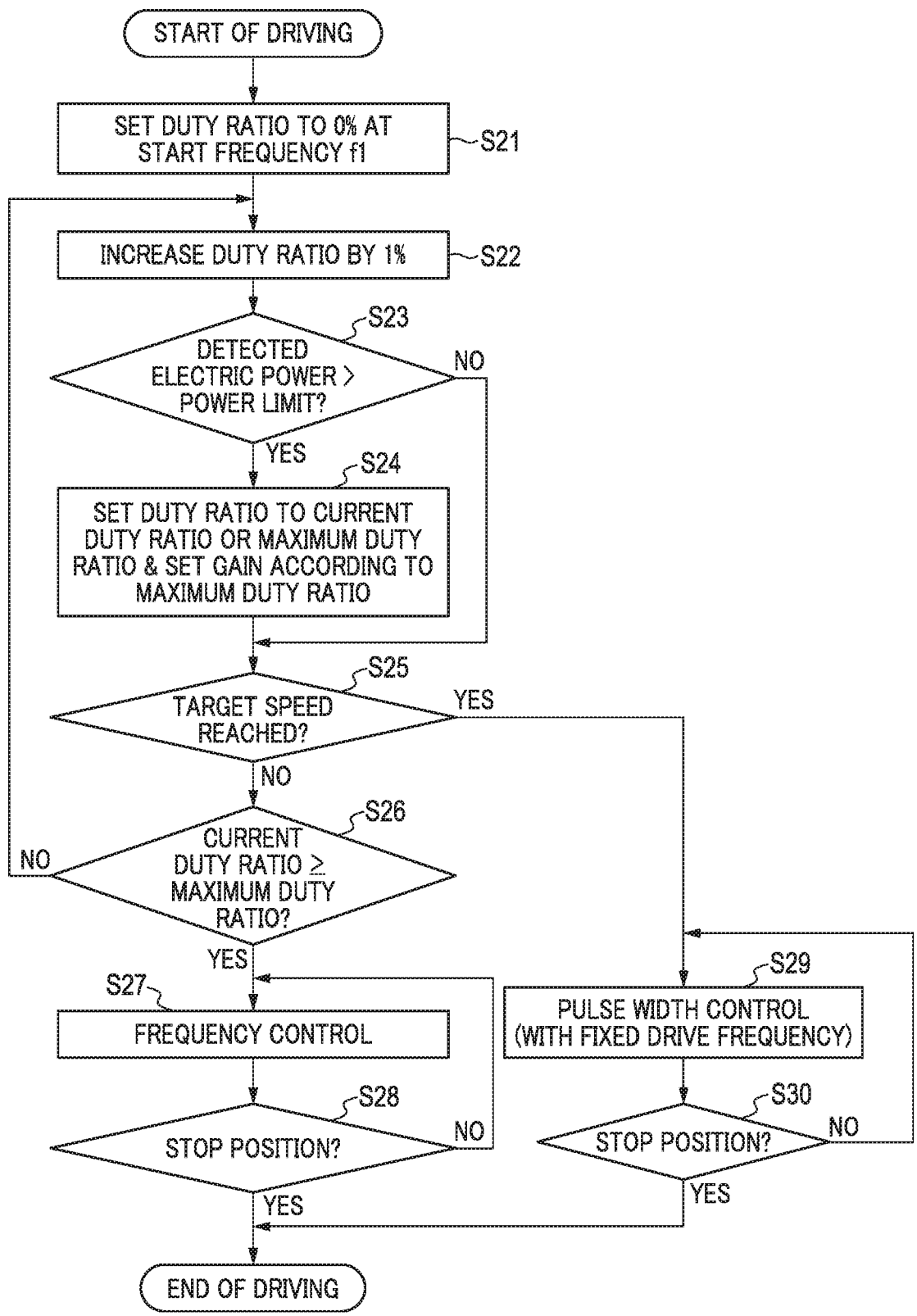
FIG. 11 is a flowchart useful in explaining a method of controlling a vibration actuator, according to a second embodiment.

FIG. 11 is a flowchart useful in explaining the method of controlling the vibration actuator 200, according to the second embodiment, by the MPU 11. Processing operations (steps) indicated by step numbers in FIG. 11 are realized by the MPU 11 that performs the overall control of the vibration drive device 100 by executing a predetermined program.

Figure 12:
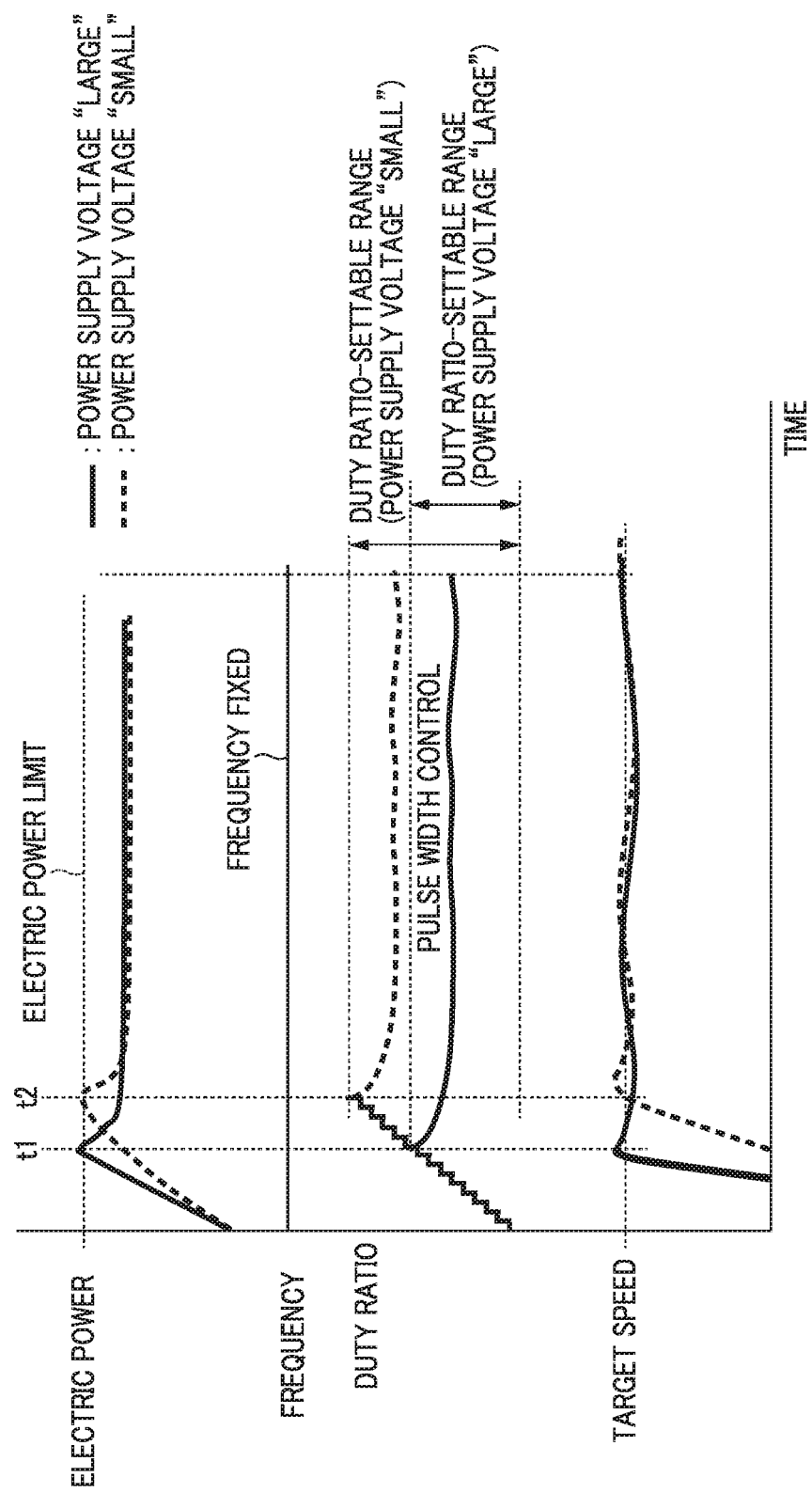
FIG. 12 is a diagram showing a relationship between detected electric power, drive frequency, the duty ratio of a switching pulse, and drive speed, exhibited when the vibration actuator is controlled by the control method according to the second embodiment.

In a step S21, the MPU 11 fixes the start frequency to a value f1, sets the duty ratio of the switching pulse (pulse signal output from each of the respective oscillators of the signal generation sections 10a and 10b) to 0%, and turns on the power to start the vibration actuator 200. FIG. 12 is a diagram showing a relationship between detected electric power, the drive frequency, the duty ratio of the switching pulse, and the drive speed (detected speed), at the start of the vibration actuator 200. In a step S22, the MPU 11 progressively increases the duty ratio of the switching pulse as shown in FIG. 12 while monitoring the power supply voltage and the drive speed. Here, the duty ratio of the switching pulse is increased stepwise by an increment of 1%, but the duty ratio of the switching pulse is not necessarily required to be increased stepwise by the increment of 1%.

In a step S23, the MPU 11 determines whether or not the detected electric power has exceeded the electric power limit specified in advance. If it is determined that the detected electric power has exceeded the electric power limit (YES to the step S23), the MPU 11 proceeds to a step S24, whereas if it is determined that the detected electric power is not larger than the electric power limit (NO to the step S23), the MPU 11 proceeds to a step S25. In the step S24, the MPU 11 sets the duty ratio of the switching pulse and the gain. More specifically, in a case where the power supply voltage is "large", as indicated by the solid line in FIG. 12, the detected electric power reaches the electric power limit at a time t1 at which the duty ratio of the switching pulse is increased to 25%. Therefore, the duty ratio of the switching pulse is set to 25% and the gain is set to 1.0 (see FIG. 7B) in accordance with this. Further, in a case where the power supply voltage is "small", as indicated by the broken line in FIG. 12, the detected electric power reaches the electric power limit at a time t2 at which the duty ratio of the switching pulse is increased to 50%. Therefore, the duty ratio of the switching pulse is set to 50% and the gain is set to 3.0 (see FIG. 7B) in accordance with this. Note that in the case where the power supply voltage indicated by the solid line in FIG. 12 is "small", if the detected electric power does not reach the electric power limit even when the duty ratio of the switching pulse is increased to 50%, the duty ratio is fixed to 50% at which the maximum electric power can be input, thereby preventing the duty ratio from being set to be larger than 50%.

In the step S25, the MPU 11 determines whether or not the detected speed has reached the target speed. If it is determined that the detected speed has reached the target speed (YES to the step S25), the MPU 11 proceeds to a step S29, whereas if it is determined that the detected speed has not reached the target speed (NO to the step S25), the MPU 11 proceeds to a step S26. In the step S26, the MPU 11 determines whether or not the current duty ratio of the switching pulse is equal to or larger than the maximum duty ratio. If it is determined that the current duty ratio is equal to or larger than the maximum duty ratio (YES to the step S26), the MPU 11 proceeds to a step S27, whereas if it is determined that the current duty ratio of the switching pulse is smaller than the maximum duty ratio (NO to the step S26), the MPU 11 returns to the step S22.

In the step S27 and a step S28, the MPU 11 performs the frequency control, whereas in the step S29 and a step S30, the MPU 11 performs the pulse width control. These steps S27, S28, S29, and S30 are the same as the steps S7, S9, S10, and S12, described with reference to FIG. 8, respectively, and hence description thereof is omitted. If it is determined in the steps S28 and S30 that the moving element 207 has reached the stop position, the MPU 11 stops the driving of the vibration actuator 200, followed by terminating the present process.

Power consumption is increased and reduced not only according to the power supply voltage, but also according to an environmental temperature, etc. Although in the first embodiment, the value of the power supply voltage is detected, electric power output from the power source is not directly detected, and hence there is a fear that electric power exceeds the electric power limit due to an influence of the environmental temperature, etc. To cope with this, in the second embodiment, electric power is directly monitored and is limited according to a result of monitoring, and hence it is possible to prevent electric power from exceeding the electric power limit. Further, in a case where the maximum duty ratio of the switching pulse is determined according to the value of the power supply voltage, there is a possibility that power consumption becomes so low as not to be capable of producing a set output, depending on the environmental temperature, etc. However, in the second embodiment, the drive control that makes the electric power close to the electric power limit can be performed, and hence it is possible to produce the maximum output. Further, when the maximum duty ratio of the switching pulse is determined, the gain is set according to the determined maximum duty ratio, and hence similar to the first embodiment, it is possible to smoothly switch between the frequency control and the pulse width control.

In the above description, the maximum duty ratio of the switching pulse is determined so as to prevent electric power detected at the start of the vibration actuator 200 from exceeding the electric power limit. On the other hand, the maximum duty ratio of the switching pulse may be determined such that electric current detected at the start of the vibration actuator 200 is prevented from exceeding a limit value.

Next, a description will be given of a third embodiment of the present invention. In the above-described second embodiment, the start frequency is fixed when the vibration actuator 200 is started and the duty ratio (pulse width) of the switching pulse is progressively increased, whereby the maximum duty ratio at which electric power does not exceed the electric power limit is determined. On the other hand, in the third embodiment, power consumption is monitored also during the frequency control or the pulse width control after the start of the vibration actuator 200, and when power consumption exceeds the electric power limit, the set value of the maximum duty ratio of the switching pulse is changed.

Figure 13A:
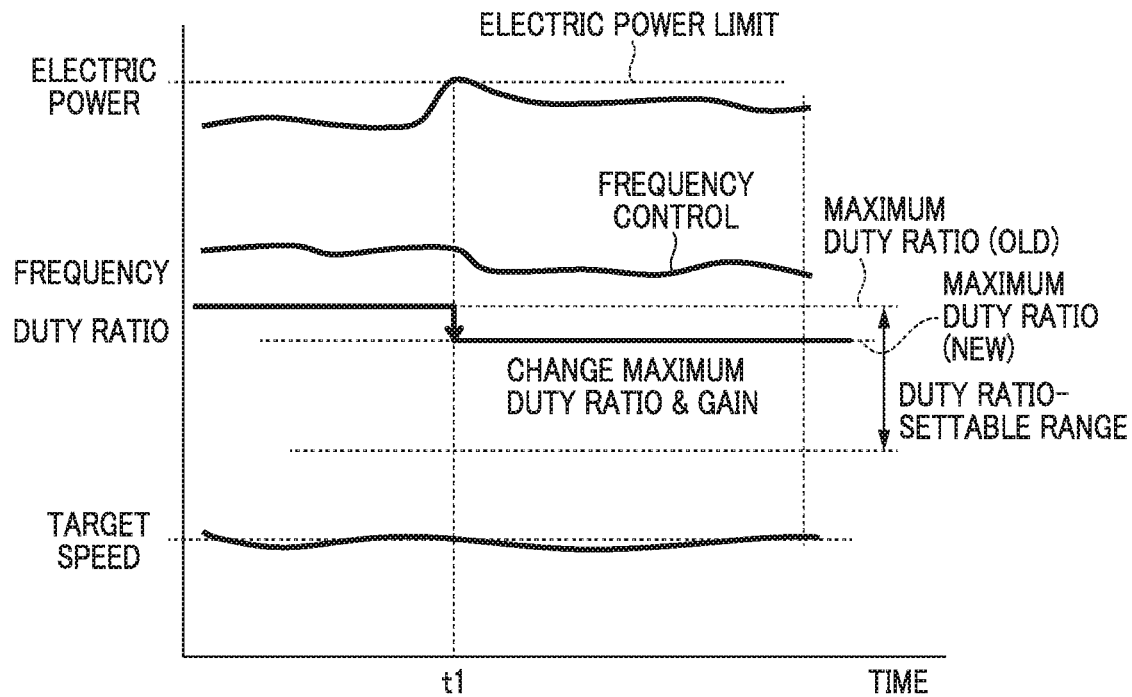
FIG. 13A is a diagram showing a relationship between detected electric power, drive frequency, the duty ratio of a switching pulse, and drive speed, exhibited when the maximum duty ratio is changed during frequency control by a method of controlling a vibration actuator, according to a third embodiment.

FIG. 13A is a diagram useful in explaining an operation for changing the maximum duty ratio when the frequency control is performed after setting the maximum duty ratio of the switching pulse as described in the first and second embodiments. The controller 300' of the vibration drive device 100 always monitors the value of electric power using the electric power detection circuit 14 during driving of the vibration drive device 100. From the start to a time close to a time t1, the drive speed is controlled by controlling the drive frequency in a state in which the duty ratio is fixed to the maximum duty ratio set at the start and the gain is set in accordance with this maximum duty ratio. At the time t1, the monitored value of electric power has exceeded the electric power limit. It can be presumed that this is caused by a change in environmental temperature, a change in power supply characteristics (battery characteristics), or the like. To cope with this, a new maximum duty ratio obtained by reducing the maximum duty ratio set at the start by several % is set so as to prevent the electric power from exceeding the electric power limit, and the gain is set again according to the newly set maximum duty ratio. In the frequency control, the speed characteristics with respect to the frequency are not changed even when the maximum duty ratio is changed, and hence the drive control is not adversely affected by a change in the gain.

Figure 13B:
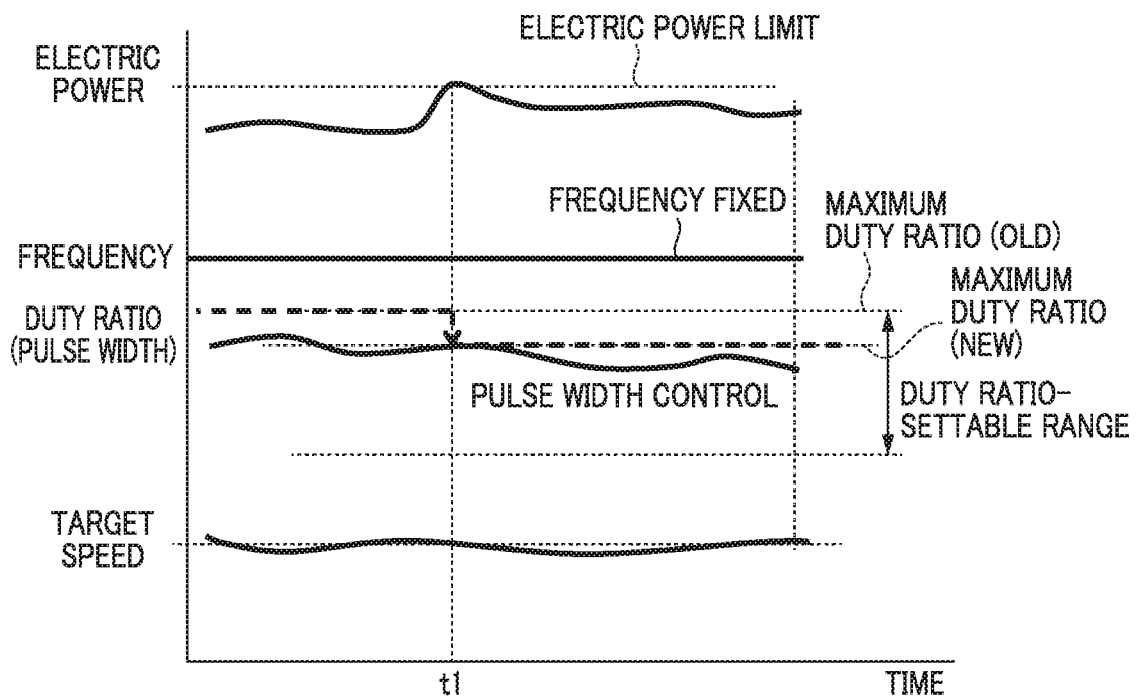
FIG. 13B is a diagram showing a relationship between the detected electric power, the drive frequency, the duty ratio of the switching pulse, and the drive speed, exhibited when the maximum duty ratio is changed during pulse width control by the control method according to the third embodiment.

FIG. 13B is a diagram useful in explaining an operation for changing the maximum duty ratio when the pulse width control is performed after setting the maximum duty ratio of the switching pulse as described in the first and second embodiments. The controller 300' of the vibration drive device 100 always monitors the value of electric power using the electric power detection circuit 14 during driving of the vibration drive device 100. From the start to a time close to the time t1, the drive speed is controlled by controlling the duty ratio within a duty ratio-settable range between the maximum duty ratio set at the start (old) and the minimum duty ratio (0%). When the monitored value of electric power has exceeded the electric power limit at the time t1, the maximum duty ratio is reduced and the gain is set again according to the reduced maximum duty ratio. With this, the duty ratio-settable range of the switching pulse in the pulse width control is changed to a range between the maximum duty ratio (new) and the minimum duty ratio (0%), and it is also possible to smoothly switch the speed control between the pulse width control and the frequency control. That is, even when the maximum duty ratio is changed, the speed characteristics with respect to the operation amount at the control switching point where the speed control is changed from or to the frequency control are not changed similar to the state before changing the maximum duty ratio, and hence it is possible to perform driving (control) which is not adversely affected by the change of the control method.

In the third embodiment, electric power is always detected during the drive control to prevent electric power from exceeding the electric power limit, and in a case where a condition equivalent to the condition in which the power supply voltage becomes high, the maximum duty ratio is reduced, and the gain is set again according to the new maximum duty ratio at the same time. This makes it possible to always maintain electric power at or lower than the electric power limit even when the power supply voltage varies or the environment changes, and control the drive speed without changing the characteristics of change in drive speed with respect to the operation amount at the control switching point between the frequency control and the pulse width control. Note that in the present embodiment, electric power is always detected during the drive control, and the control is performed so as to prevent electric power from exceeding the electric power limit, electric current may be detected in place of electric power, and the control may be performed so as to prevent electric current from exceeding the electric current limit.

Figure 14:
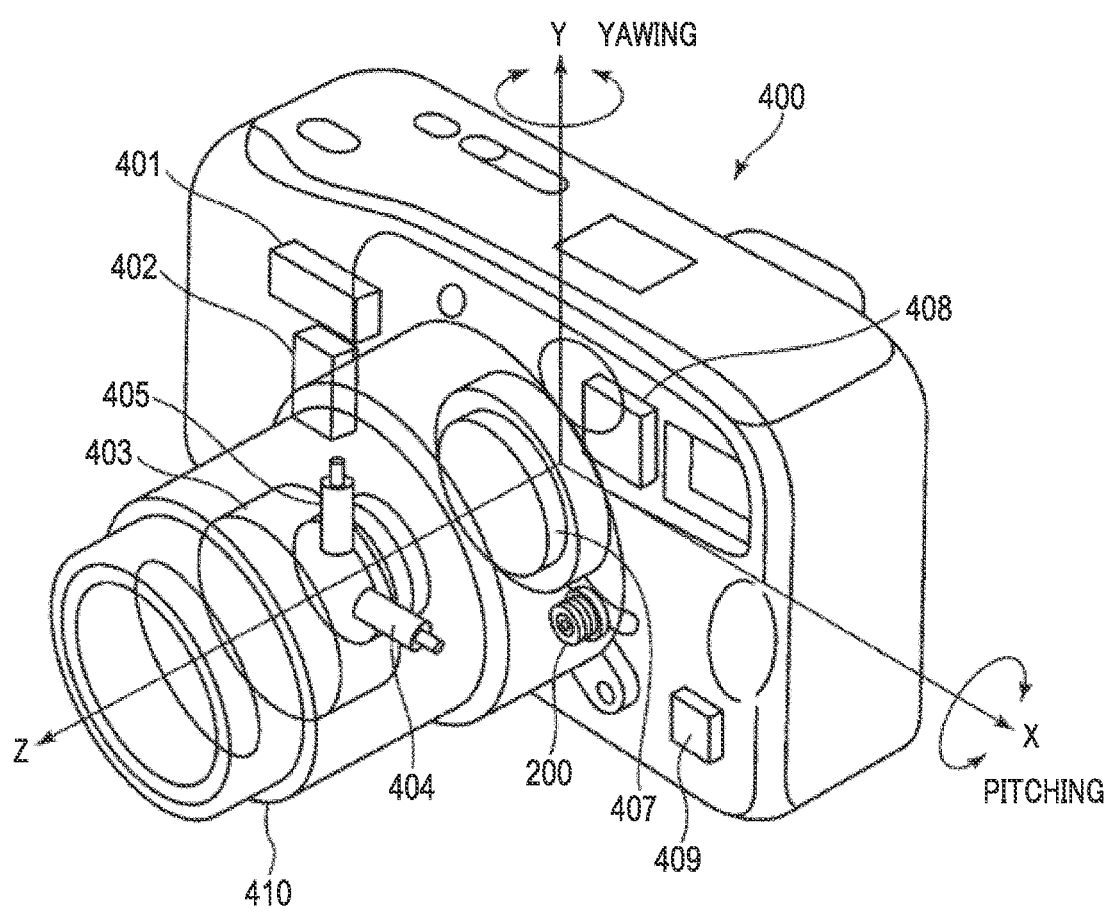
FIG. 14 is a perspective view of an image pickup apparatus equipped with the vibration drive device.

Next, a description will be given of an image pickup apparatus equipped with the vibration drive device according to any of the above-described embodiments. FIG. 14 is a perspective view showing the schematic arrangement of the image pickup apparatus, denoted by reference numeral 400, equipped with the vibration drive device according to any of the above-described embodiments, in a partially transparent state. More specifically, the image pickup apparatus 400 is a digital camera. A lens barrel 410 is attached to the front side of the image pickup apparatus 400. Inside the lens barrel 410, there are arranged a plurality of lenses (not shown) including a focus lens 407 and a camera-shake correction optical system 403. Rotations of two-axis coreless motors 404 and 405 are transmitted to the camera-shake correction optical system 403, whereby the camera-shake correction optical system 403 can be vibrated in a vertical direction (Y-direction) and a lateral direction (X-direction).

The image pickup apparatus 400 has an image pickup device 408 arranged in a main body side thereof, and light incident through the lens barrel 410 forms an optical image on the image pickup device 408. The image pickup device 408 is a photoelectric conversion device, such as a CMOS or CCD sensor, and converts the optical image to analog electric signals. The analog electric signals output from the image pickup device 408 are converted to digital signals by an analog-to-digital converter, not shown, and then stored in a storage medium, such as a semiconductor memory, not shown, as image data (video data) after being subjected to predetermined image processing by an image processing circuit, not shown.

Further, in the main body side of the image pickup apparatus 400, there are disposed, as internal devices, a gyro sensor 401 for detecting an amount of camera shake (vibration) in a vertical direction (pitching) and a gyro sensor 402 for detecting an amount of camera shake (vibration) in a horizontal direction (yawing). The coreless motors 404 and 405 are driven in respective directions opposite from directions of vibrations detected by the gyro sensors 401 and 402 to vibrate an optical axis of the camera shake correction optical system 403 extending in a Z-direction. As a result, vibration of the optical axis caused by camera shake is canceled out, whereby it is possible to take an excellent photograph subjected to camera shake correction.

The vibration actuator 200 is driven by any of the control methods (driving methods) described in the first to third embodiments, and drives the focus lens 407 arranged in the lens barrel 410 in the direction of the optical axis (Z-direction) via a gear train, not shown. However, this is not limitative, but the vibration actuator 200 can be used for driving of a desired lens, such as a zoom lens (not shown). A control circuit 409 for driving the vibration actuator 200 using any of the driving methods described in the first to third embodiments is assembled in the main body side of the image pickup apparatus 400.

By equipping the vibration drive device according to any of the above-described embodiments in the image pickup apparatus, as the lens drive device, it is possible to smoothly perform lens driving in a wide range from high speed to low speed without being adversely affected by a change in voltage of a power source, such as a battery, whereby it is possible to photograph a still image or moving image having high image quality.

Incidentally, recent image pickup apparatuses are equipped with a function of photographing both of a still image and a moving image. In still image photographing, it is necessary to quickly adjust the focus on an object, and hence it is necessary to drive the vibration actuator at high speed. On the other hand, in object tracking performed in moving image photographing, it is necessary to drive the vibration actuator at low speed. Therefore, the vibration actuator is required to achieve both of high-speed driving and low-speed driving, and drive the lens with less speed variation. Particularly, changes in speed at low-speed driving generate a feeling of strangeness in a photographed moving image, and hence speed stability in low-speed driving is strongly required. The present invention is particularly effective in meeting this requirement. That is, as described above in the embodiments, the vibration drive device 100 makes it possible to perform driving with less speed variation, compared with the conventional devices, whereby it is possible to enhance the quality of moving images.

The present invention has been described heretofore based on the embodiments thereof. However, the present invention is not limited to these embodiments, but it is to be understood that the invention includes various forms within the scope of the gist of the present invention. Further, the embodiments of the present invention are described only by way of example, and it is possible to combine the embodiments on an as-needed basis. For example, in the above-described embodiments, the description is given of an example in which the vibration drive device according to the present invention is applied to the image pickup apparatus. However, the vibration drive device according to the present invention is not limitedly applied to the image pickup apparatus, but can be widely applied to electronic apparatuses each including a moving element that requires position determination or being driven at a constant speed, as a drive device for driving the moving element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-092293 filed May 11, 2018, which is hereby incorporated by reference herein in its entirety.

What is claimed is:

1. A vibration drive device including:
    a vibration actuator having a vibration element and a contact body in contact with the vibration element; and
    a controller that controls driving of the vibration actuator, wherein the controller is configured to set a gain for frequency control and a gain for pulse width control of the vibration actuator so as to prevent electric power or electric current from exceeding an electric power limit or an electric current limit that is set in advance.

2. The vibration drive device according to claim 1, wherein the controller is configured to generate a pulse by switching a DC voltage.

3. The vibration drive device according to claim 2, wherein the controller is configured to determine a maximum duty ratio of the pulse based on a driving condition of the vibration actuator.

4. The vibration drive device according to claim 2, wherein the controller is configured to control frequency of the pulse.

5. The vibration drive device according to claim 2, wherein the controller is configured to control a duty ratio of the pulse.

6. The vibration drive device according to claim 1, wherein the controller is configured to set the gain for frequency control and the gain for pulse width control of the vibration actuator according to a value of power supply voltage connected to the vibration actuator.

7. The vibration drive device according to claim 3, wherein the controller is configured to set the gain for the pulse width control with respect to the maximum duty ratio based on a relationship between the maximum duty ratio and a value of the gain to be set for the pulse width control stored in a storage device.

8. The vibration drive device according to claim 3, wherein the controller is configured to determine the maximum duty ratio according to a value of the DC voltage.

9. The vibration drive device according to claim 1, wherein the controller is configured to:
    increase the duty ratio of the pulse in a state in which drive frequency is fixed when the vibration actuator is started,
    determine a duty ratio at which a value of electric power or electric current for generating the pulse reaches a limit value specified in advance as the maximum duty ratio, and
    set the gain for the pulse width control again according to the determined maximum duty ratio.

10. The vibration drive device according to claim 3, wherein in a case where a value of electric power or electric current for generating the pulse reaches a limit value specified in advance when the vibration actuator is driven by the frequency control at the maximum duty ratio, the controller is configured to:
    change the maximum duty ratio to a duty ratio at which the electric power or the electric current does not exceed the limit value,
    determine the changed duty ratio as a new maximum duty ratio, and
    set the gain for the pulse width control again according to the new maximum duty ratio.

11. The vibration drive device according to claim 3, wherein in a case where a value of electric power or electric current for generating the pulse reaches a limit value specified in advance when the vibration actuator is driven by the pulse width control at the maximum duty ratio,
    the controller is configured to:
    change the maximum duty ratio to a duty ratio at which the electric power or the electric current does not exceed the limit value,
    determine the changed duty ratio as a new maximum duty ratio, and
    set the gain for the pulse width control again according to the new maximum duty ratio.

12. The vibration drive device according to claim 1, wherein the controller performs control such that control characteristics of the frequency control and control characteristics of the pulse width control substantially coincide with each other.

13. The vibration drive device according to claim 12, wherein the control characteristics of the frequency control are expressed by a slope of drive speed of the vibration actuator with respect to drive frequency,
wherein the control characteristics of the pulse width control are expressed by a slope of the drive speed with respect to the duty ratio of the pulse, and
wherein the controller is configured to set a first gain and a second gain such that a product of the slope of the drive speed with respect to the drive frequency at a time when the frequency control is performed and the first gain, and a product of the slope of the drive speed with respect to the duty ratio at or near the maximum duty ratio at a time when the pulse width control is performed and the second gain become equal to each other.

14. The vibration drive device according to claim 1, wherein the controller is provided with a first setting associated with a magnitude of the power supply voltage and a second setting associated with a magnitude of the power supply voltage lower than that in the first setting, and a gain associated with the first setting is less than a gain associated with the second setting.

15. An electronic apparatus including:
a member; and
a vibration drive device for moving the member,
wherein the vibration drive device comprises:
a vibration actuator having a vibration element and a contact body in contact with the vibration element; and
a controller that controls driving of the vibration actuator,
wherein the controller is configured to set a gain for frequency control and a gain for pulse width control of the vibration actuator so as to prevent electric power or electric current from exceeding an electric power limit or an electric current limit that is set in advance.

16. A method of controlling a vibration actuator having a vibration element and a contact body in contact with the vibration element, comprising:
supplying an alternating voltage to the vibration actuator; and
setting a gain for frequency control and a gain for pulse width control of the vibration actuator so as to prevent electric power or electric current from exceeding an electric power limit or an electric current limit that is set in advance.

17. The method according to claim 16, wherein a maximum duty ratio of a pulse for generating the alternating voltage is determined based on a driving condition of the vibration actuator.

18. The method according to claim 17, wherein the gain for the frequency control and the gain for the pulse width control are determined according to the maximum duty ratio so as to prevent the electric power or the electric current from exceeding the electric power limit or the limit of electric current, and the alternating voltage is supplied to the vibration actuator.

19. The method according to claim 16, further comprising setting the gain for the frequency control and the gain for the pulse width control according to a value of power supply voltage connected to the vibration actuator.

* * * * *